(12) United States Patent
Fulcher

(10) Patent No.: US 6,341,602 B1
(45) Date of Patent: Jan. 29, 2002

(54) PACKAGE FOR FLAMELESS HEATING AND HEATER FOR THE PACKAGE

(76) Inventor: Fred Fulcher, 11500 W. Olympic Blvd., Los Angeles, CA (US) 90064

(*) Notice: Subject to any disclaimer, the term of this patent is extended or adjusted under 35 U.S.C. 154(b) by 0 days.

(21) Appl. No.: 09/574,264

(22) Filed: May 18, 2000

Related U.S. Application Data

(62) Division of application No. 09/265,293, filed on Mar. 9, 1999, now abandoned.

(51) Int. Cl.[7] ............................ F24J 1/00; F24J 3/00
(52) U.S. Cl. ..................... 126/263.07; 126/263.01; 126/263.08
(58) Field of Search ................ 149/37, 3, 5, 6; 126/263.01, 263.05, 263.06, 263.08, 263.07

(56) References Cited

U.S. PATENT DOCUMENTS

| | | | |
|---|---|---|---|
| 3,998,749 A | 12/1976 | Hydro | |
| 4,255,157 A | * 3/1981 | Yamaguchi et al. | 44/3 |
| 4,510,919 A | 4/1985 | Benussa | |
| 4,522,190 A | 6/1985 | Kuhn et al. | |
| 4,819,612 A | * 4/1989 | Okamoto et al. | 126/263 |
| 4,880,483 A | * 11/1989 | Baldi | 149/6 |
| 5,117,809 A | * 6/1992 | Scaringe et al. | 126/263 |
| 5,355,869 A | * 10/1994 | Pickard et al. | 126/263 |
| 5,465,707 A | 11/1995 | Fulcher et al. | |
| 5,517,981 A | 5/1996 | Taub et al. | |
| 5,611,329 A | 3/1997 | Lamensdore | |
| 5,984,995 A | * 11/1999 | White | 75/230 |

* cited by examiner

Primary Examiner—Michael J. Carone
Assistant Examiner—Aileen J. Baker
(74) Attorney, Agent, or Firm—Donald D. Mon

(57) ABSTRACT

A heater pouch adjustably to be placed in a product container. The product container holds a product to be heated by a flameless heater. The heater pouch contains tablets of exothermic material in a flexible cover. The tablets are smooth-surfaced without protuberances so they can be distributed without interference from one another. The spacing between the container and the product, which can vary from product to product, can have complicated shapes. That can be accommodated by this pouch.

11 Claims, 2 Drawing Sheets

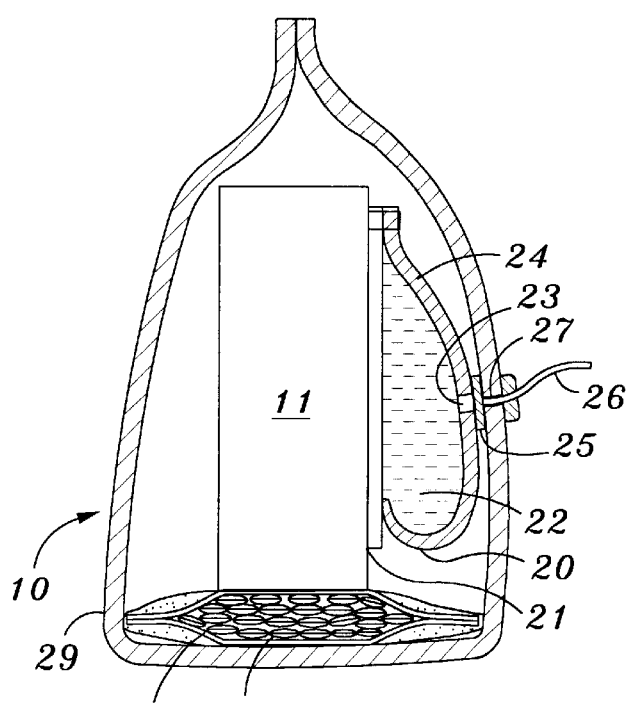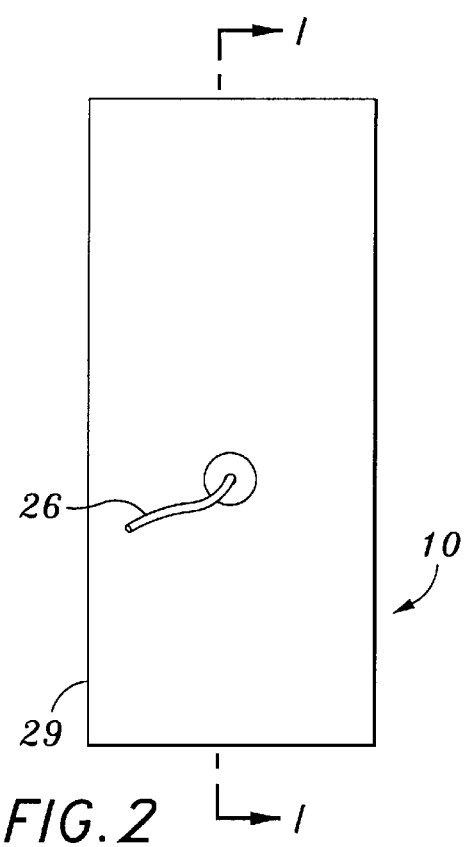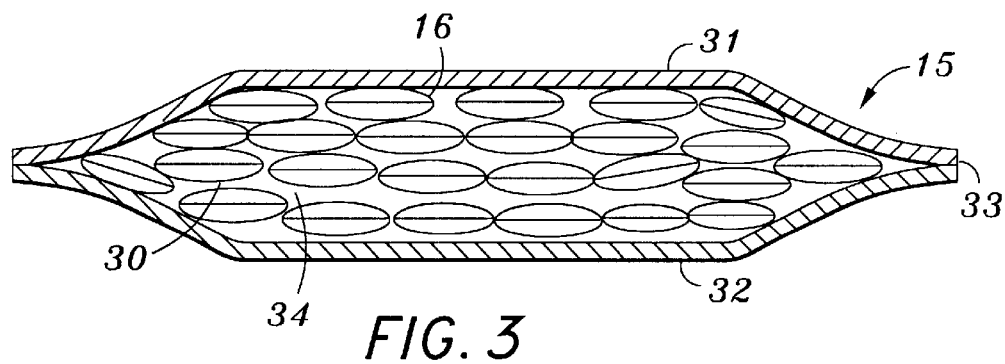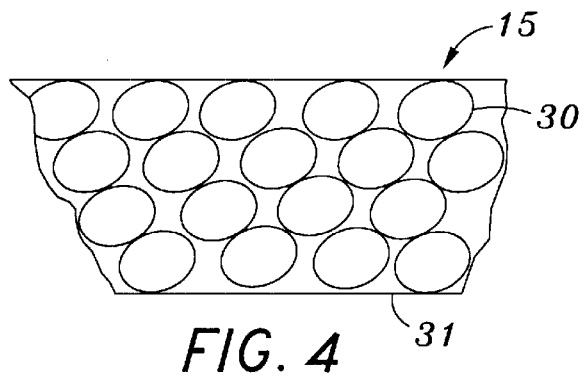

PACKAGE FOR FLAMELESS HEATING AND HEATER FOR THE PACKAGE

This is a division of U.S. patent application Ser. No. 09/265,293 now abandoned, filed Mar. 9, 1999.

FIELD OF THE INVENTION

For flameless heating of its contents, a package which includes a flameless heater, and an improved flameless heater for the package.

BACKGROUND OF THE INVENTION

Packages that contain a product, often a food product, are known which also include a flameless heater to heat the product on demand. Classical examples are provided to the military as Meals Ready To Eat ("MRE"). In addition to the military, there are many other demands, such as emergency rations for shelters, for the sportsman in the field, and for heating of non-food products.

As might be expected, because of necessary extended shelf life and extreme exposure conditions, military standards are often more stringent than are necessary for less critical applications. When the products are intended for usage in man-sensitive circumstances, there is no realistic limit on the cost of such items. However, there are many uses for self-heating products where the shelf life is shorter, or where a somewhat lesser occasional performance is acceptable, in which the costs involved in a military grade product would exclude it from the commercial market.

As with any packaged product, the cost of the packaging containing a consumable product is often a disproportionally large part of the total. When performance is absolutely necessary, as established by such standards as MIL-R-443983 for a flameless ration heater, fabrication processes and materials of construction will reasonably be expected to be high. For these high standards, the configuration and contents of a heater can be related to a particular product and can be manufactured with expensive and time-consuming procedures. No one objects to the cost of providing only the best for military rations in the field, for example. But a housewife can reasonably object to an unnecessarily high price when an occasional overheat or underheat of a cup of chocolate is the only adverse consequence of a less than optimal heater.

It is also a useful objective to enable a different total caloric delivery for different foods that would be sold in an identical package. For example, a stew would require more calories per unit volume than a souffle, both of which could fit in the same package. This invention enables the source of heat to be adjusted both as to the amount supplied and where it can, be positioned, all without significant adjustments to the packaging or to the heat sources themselves.

A well-known flameless heating package is shown in Fulcher and Huang U.S. Pat. No. 5,465,707, which is incorporated herein in its entirety for its showing of a structural package of the class to which this instant invention relates. The improvements of this invention relate to the heater and to a package containing the improved heater. The said patent may be referred to for its showing of the theory, operation, and details of materials of the package and of its heater constituents. A well-known construction for a flameless heater element is shown in Kuhn U.S. Pat. No. 4,522, 190. Still another is shown in Lamensdorf patent U.S. Pat. No. 5,611,329. In the Kuhn patent, a flameless heater comprised of an exothermic supercorrosive alloy of magnesium and iron is sintered into large single shapes which generally conform to the container for the product. In the Lamensdorf patent, instead of being a large sintered body, the supercorrosive alloy is a fine powder contained loosely in a shaped container. The shaped container is adapted to hold portions of the powder in defined regions.

The Kuhn construction is expensive. Sintering requires considerable process time. In addition there are the costs of handling, processing, and making sintering molds and dies, all of which drive up the price of the product.

In the Lamensdorf device. The powder simply slumps to the lowest point in its pockets, resulting in an uneven distribution of heat—too hot in some areas and too cold in others, and in an uncertain rate of production of heat. This less effective performance is accompanied by the larger cost of the segmented packaging and of its assembly. Even less effective would be a loose amount of powder in a large flexible envelope.

It is an object of this invention to provide a package for products with a flameless heater nearly equal in performance to those which meet the high military standards, but at an importantly lesser cost of components and assembly.

It is another object of this invention to provide a flameless heater which can accommodate and effectively heat products of widely differing sizes, shapes and caloric requirements without resorting to the use of loose powders or requiring formation of a large specially shaped structure for the heater.

BRIEF DESCRIPTION OF THE INVENTION

A flameless heater for a package of product according to this invention utilizes a composition which, when wetted with water, will have an exothermal effect. The presently preferred substance is an exothermic supercorrosive alloy of magnesium and iron that is passive and stable while dry. Other exothermal sources can be used, included sources that are not electrochemical, and other electrochemical systems than this one. Heats of solution or of hydration (from calcium oxide, for example), are non-electrochemical exothermal sources within the scope of the invention.

When wetted with water containing an electrolyte, the customary exothermal and gas generating reactions occur with the preferred embodiment, as with the other useful substances.

According to this invention the alloy is preferably placed in a flexible heater pouch, a portion of which is both water-permeable and gas-permeable. The heater and the product are contained in an impermeable and insulating outer enclosure. The container for the product, or the product itself, is in heat conductive relationship, usually contiguous, to the permeable pouch.

This pouch itself is optional. When the product container and the outer package are suitably proportioned, the tablets may be distributed, between them without the assistance of a pouch.

According to a feature of this invention, the exothermic material is contained in tablet form, preferably compressed or possibly sintered, in a shape such that in a flexible pouch they can be distributed over a desired area, with a desired density distribution.

According to a preferred but optional feature of the invention, the tablets are compressed into a rigid self-shape retaining structure.

The above and other features of this invention will be fully understood from the following detailed description and the accompanying drawings, in which:

BRIEF DESCRIPTION OF THE DRAWINGS

FIG. 1 is a cross-section taken at line 1–2 in FIG. 2;

FIG. 2 is a side view of a package according to this invention;

FIG. 3 is a cross-section of a heater pouch according to this invention taken at line 3—3 in FIG. 4;

FIG. 4 is a top view of FIG. 3;

DETAILED DESCRIPTION OF THE INVENTION

Figure 5:
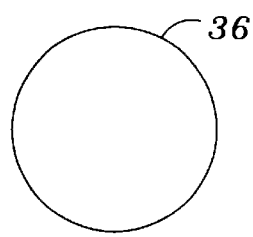
FIG. 5 is a top view of a tablet according to the invention.

A package 10 incorporating this invention is shown in FIG. 1. Its purpose is removably to enclose a product container 11 that holds the consumable or useful item so as to be physically protected during storage and handling and so as to be heated before it is taken from the product container. Customarily the wall or walls of the product container will be gas-impermeable, liquid-impermeable, and at least some part of the wall will be heat conductive. The shape of the product container is arbitrary. It may be shaped as a rectangular or cylindrical drink container, or as a rectangular dish or pan, as examples. Whatever the construction, it will be amenable to heat transfer through at least one of its walls so its contents can be heated.

Especially because this invention will mostly be used for heating of foods, the even distribution of heat over the surface of the product container, a suitable rate of temperature increase, suitable caloric potential, and avoidance of excessively hot or excessively cold spots are of significant importance. The exothermic materials used in this device generate a very intensive local heat, which is best distributed over a substantial area to avoid overheating or underheating of local areas, whereby to achieve a more uniform temperature throughout the product. Especially for solid or semi-solid foods, localized regions of hotter or colder foods are undesirable, because some parts may be cool and other scorched or burned.

These objectives are best met by reasonably closely associating the location of heating elements to the surface to be heated. Kuhn attempts to provide this advantage, but at the economic cost of a solid, shaped and sintered large body. Loose powders cannot provide this advantage because of their tendency to slump into a pile which can become too hot and provide only localized heat.

To overcome the disadvantages of the prior art at a reasonable cost in the instant invention, a heater pouch 15 is provided which itself can be closely conformed to a surface of the product container. It may be shaped, or may be flexible so it can be bent so as to be placed in reasonable adjacency to a substantial area of the product container. The heater pouch itself is made of material that is resistant to the chemical and heating effects of its contents. At least a portion of it will be gas-permeable and liquid-permeable. This pouch is preferably made of a material which is also water absorbent, so as to receive and to some-extent control the rate of flow of an electrolyte solution through it to the enclosed exothermic material.

A plurality of exothermic "tablets" 16 is placed in this closed heater pouch. The shape and size of these tablets can vary, as will later be described.

When the package is to include its own charge of water, an impermeable electrolyte bag 20 is enclosed in the outer enclosure 29. Preferably it will be held in place by a support sheet 21 to which it is attached such as by staples. The bag contains a solution 22 of water and an electrolyte such as sodium chloride which will enable the exothermic reaction to occur. Bag 20 will remain closed until use of the products is desired.

A port 23 in the wall 24 of electrolyte bag 20 is closed by a removable patch 25 or strip. The bag remains closed until after the patch or strip is removed. When it is removed, the electrolyte solution will flow into outer enclosure 29, where it will contact the heater pouch, flow into it, and contact the tablets to start the exothermal reaction. In this embodiment a pull string 26 is attached to the patch or strip. It passes through a hole 27 in the wall of the outer enclosure, which may have a patch to the hole through which it passes. A sufficient pull on the string will remove the patch or strip and permit solution to flow out of the bag. The open hole through which the string passed will permit steam to leave the package.

The outer enclosure 29 is formed of any suitable water and gas impermeable material, which is also thermally insulating. A good grade of suitably treated cardboard or corrugated cardboard is suitable.

The heater pouch itself is best shown in FIGS. 3 and 4. These drawings show the use of circularly shaped tablets 30. The pouch has a top sheet 31, and a bottom sheet 32. They are joined by a peripheral seam 33 which forms a cavity 34 in which tablets of any desired shape are confined. The material of the sheets must have at least some region which is gas-permeable and liquid-permeable. Preferably all of it is. Conventional tea bag paper is the preferred material. It is made to withstand high temperatures and liquid immersion.

The drawings illustrate a large variety of useful tablet shapes, but far from all of them. Their common characteristic is a smaller thickness than one of their lateral dimensions so that the tablets will tend to lie flat in alignment with one another when more than a single layer of them is used. Then a substantial area of each tablet is generally aligned with the surface of the product container.

While it will be the usual practice to place the tablets loosely in the heater pouch and then massage the pouch and tablets into place, it is also possible to fix a first layer of tablets to one of the sheets, using a non-aqueous adhesive, perhaps a silicone. This will enable a very tailored distribution of the heat effect.

This further illustrates the advantages of this invention because the tablets can be placed so as to provide nearly even heat distribution, or more in some localized areas where more calories may be needed because of the shape or nature of the product itself.

It is also possible, and within the scope of this invention, to eliminate the pouch itself, and to distribute the tablets between the product container and the outer package. The tabletted nature of the exothermic material facilitates the arrangement of the exothermic material.

The term "tablet" will be used herein generically for tablets 16 to describe the configuration of pieces of the exothermic heater material used. While shapes of arbitrary configuration may be used, the objectives of this invention are best served by using shapes which can be formed with the use of conventional pill or caplet forming machinery.

The term "tablet" denotes individual pieces that are larger than powder sizes so there is no tendency to slump freely into a corner of the pouch without any shape definition. Similarly, they must be large enough to slide along one another and move or be held compactly in the pouch so as closely to approach the product container without forming clumps. While in the specific example given herein of a product container, the heater is beneath the bottom of a tall structure, many applications such as for meal entrees will have the heater under the bottom of a part occupying an area that is perhaps 3×5 inches. For such applications, a reasonably even distribution of tablets over the entire area is of importance.

For this reason, tablet shapes without tangling protrusions such as points, legs or spikes will be preferred. Rounded edges and flat or obtuse surfaces on the tablets will allow for more even distribution of the tablets and more convenient assembly of the packaged product.

In a preferred construction, the tablets have a dimension of thickness smaller than one of its other dimensions so there will be the tendency for a larger face that includes the other dimension to align itself with the product container which the heater abuts. For example in FIGS. 5–8, the circular face has a diameter greater than the thickness. Similar considerations apply to the shapes shown in FIG. 9–14.

The term "tablet" further contemplates at least one dimension at least as large as ⅛ inch, and usually larger. Any dimension larger than about ½ inch will usually not provide tablets that can be distributed well in a small envelope although it can be used, and is within the scope of this invention. It is better practice to use a larger number of smaller tablets. As an example, circular tablets between about ⅛ and 3/16 inch and a diameter about ½ inch is suitable.

The dimension of thickness should be sufficient that the tablet will not break readily when handled and packaged. A thickness on the order of about ⅛ inch or greater will usually be chosen for this reason.

Figure 6:
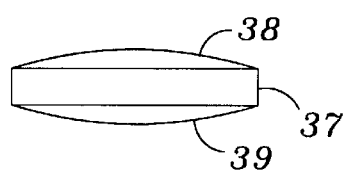
FIG. 6 is a side view of FIG. 5 showing one embodiment of tablet.
Figure 7:
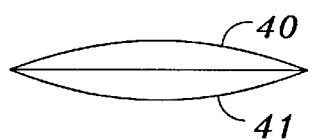
FIGS. 7 and 8 are side views with the same top view of FIG. 5, of other tablet shape.
Figure 8:
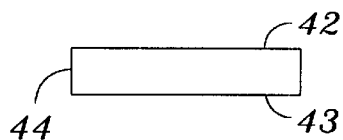

FIG. 5 shows the top view of a tablet 36 whose side view may reflect several different shapes. In FIG. 6, the tablet's side view has a central band 37 and two convex face 38, 39. In FIG. 7, the side view shows two convex faces 40, 41. In FIG. 8, the side view shows two flat faces 42, 43 spaced by a central band 44. These "pill" shape tablets are readily formed on conventional pill-forming machinery.

Figure 9:
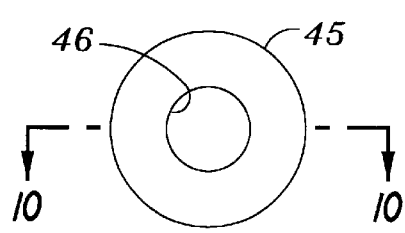
FIG. 9 is a top view of another tablet embodiment.
Figure 10:
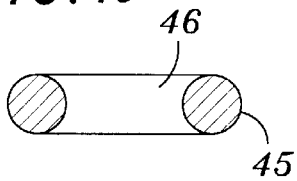
FIG. 10 is a cross-section taken at line 10—10 in FIG. 9.

FIGS. 9 and 10 show a torus shaped tablet 45 with a hole 46 in the center of a circularly sectioned ring.

Figure 11:
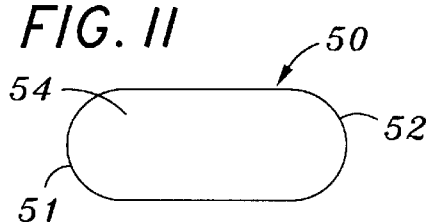
FIG. 11 is a top view of another embodiment of the invention.
Figure 12:
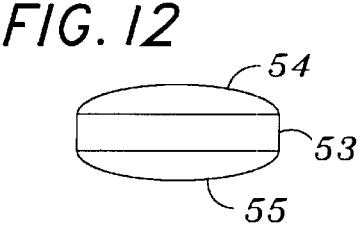
FIG. 12 is a side view of FIG. 11.

FIGS. 11 and 12 show a caplet-shaped tablet 50 formed with two arcuately shaped ends 51, 52 a central peripheral band 53 and convex bent plane faces 54, 55.

Figure 13:
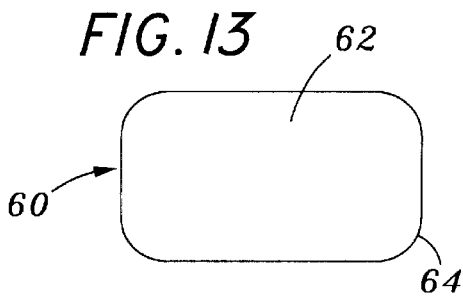
FIG. 13 is a top view of yet another embodiment of tablet.
Figure 14:
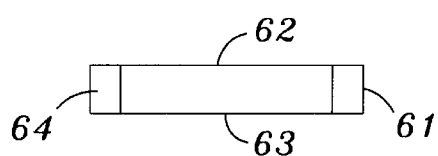
FIG. 14 is a side view of FIG. 13.

FIGS. 13 and 14 show a lozenge shaped tablet 60 with a peripheral band 61, faces 62, 63 and curved corners 64.

All of the above embodiments are readily formed on pill-forming machinery or in sintering molds. All have a dimension of thickness which is shorter than at least one lateral dimension.

The preferred material for the tablets will include supercorrosive Mg/Fe alloy as its principal exothermic component. This alloy is well-known for its exothermal reaction when wetted with an aqueous electrolyte solution, usually sodium chloride solution about 5%. For the purpose of forming tablets with selective properties, additives are generally used along with the alloy. For example a die lubricant, a binder, an additional source of heat, means to control the rate at which water enters the tablet, formation of channels for penetration of water between particles of the alloy.

The presently-preferred exothermic charge for the tablet is a compressed mixture of finely ground Mg/Fe supercorrosive alloy, 96%; monocrystalline cellulose, 1%; and stearic acid, 3%, all by weight. The cellulose acts as a binder and provides channels for absorption of water into the tablet itself. The stearic acid is a die lubricant.

This is typical of many other electrochemical alloys which function to generate heat when wetted. Copper-containing alloys and another example of this class of exothermic alloys.

It is also possible to use as a binder a substance which itself generates heat of solution or hydration, for example calcium oxide. Used as a binder or as an additional heat source, it may be used instead of or in addition to the cellulose in quantities as high as 40% by weight of the tablet. When wetted its heat of solution adds to the caloric output.

The above formulations relate to formation of the tablets by compression to a solid shape-retaining form. It is also possible, but rarely desirable, to form them by sintering. A useful sintered tablet may comprise Mg/Fe supercorrosive alloy, and ultra high molecular weight (UHMW) polyethylene powder, pressed and sintered.

It is also useful, but rarely preferable, to use compositions which are not electrochemical in their reactions. For example, tablets consisting essentially of calcium oxide will generate heat when wetted, and are within the scope of this invention.

While the source of water is most convenient when included as an internal part of the entire package, it is also possible to supply the water separately, pouring it from an external source through an opening in the outer package, which opening will have a removable closure, perhaps a plug, cork, tear strip, or adhesive patch. Then the electrolyte bag will be eliminated. In such arrangements, the electrolyte will already have been placed in the package, unless it is preferred to have it supplied in the water.

The illustrated embodiment of the outer package is designed as a throw-away article. After the heating finished, the outer package is opened, the product removed, and the package along with the other contents is discarded. If desired, a re-usable package may be provided. In such event, there will be re-closable openings in the package to receive new product, and to receive a new heater. After these are closed, water and electrolyte can be poured in and the same results will be attained. The structures are basically the same as those which are illustrated. It may be more rigid, perhaps of a suitable plastic material, with suitable openings through it.

This invention is not to be limited by the embodiment shown in the drawings and described in the description, which are given by way of example and not of limitation, but only in accordance with the scope of the appended claims.

What is claimed is:

1. A heater pouch for providing flameless caloric heat to a product contained inside a product container, said pouch comprising: a flexible cover having a gas-permeable portion and a liquid permeable portion, said cover forming a closed cavity; and, in said cavity tablets of exothermic material which release caloric heat when wetted, there being a plurality of said tablets loosely contained in said heater pouch so as to enable the selective distribution of the heating effect of the tablets over a substantial area by physical distribution of the tablets in the heater pouch, by manipulation exerted on the cover, said tablets being smooth surfaced without protuberances whereby not to interfere with their free movement relative to one another.

2. A pouch according to claim 1 in which all of the surfaces of said tablets are flat or convex.

3. A pouch according to claim 1 in which said tablets are circular and have a diameter and a dimension of thickness, the diameter being larger than the thickness.

4. A pouch according to claim 3 in which the tablets have opposite circular faces, said faces being flat.

5. A pouch according to claim 3 in which the tablets have opposite circular faces, said faces being obtuse.

6. A pouch according to claim 2 in which said tablets are flat discs.

7. A pouch according to claim 1 in which said tablets are elongated, having a dimension of length, width and thickness, said tablets when viewed from the top having arcuate ends joined by bent covered planes, the dimension of length being larger than the dimension of thickness, to form a caplet shape.

8. A pouch according to claim 1 in which the exothermic material comprises super corrosive Mg/Fe alloy.

9. A pouch according to claim 1 in which the alloy is initially in powder form and the tablet is formed by compression together with a die lubricant and a binder.

10. A pouch according to claim 1 in which the alloy is initially in powder form and is formed by sintering together with ultrahigh molecular weight polyethylene as a binder.

11. A pouch according to claim 8 in which anhydrous calcium oxide is mixed in the alloy.

* * * * *